United States Patent
Okawa et al.

(10) Patent No.: US 11,408,791 B2
(45) Date of Patent: Aug. 9, 2022

(54) PRESSURE SENSOR WITH A CAP STRUCTURED WITH AN INNER RECEIVING SECTION THAT PREVENTS EXCESSIVE SPREADING OF A CONDUCTIVE ADHESIVE

(71) Applicant: Alps Alpine Co., Ltd., Tokyo (JP)

(72) Inventors: Hisanobu Okawa, Miyagi-ken (JP); Katsuya Kikuiri, Miyagi-ken (JP); Shoji Yoshida, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 179 days.

(21) Appl. No.: 16/859,562

(22) Filed: Apr. 27, 2020

(65) Prior Publication Data

US 2020/0256752 A1    Aug. 13, 2020

Related U.S. Application Data

(63) Continuation of application No. PCT/JP2018/040658, filed on Nov. 1, 2018.

(30) Foreign Application Priority Data

Nov. 7, 2017 (JP) .............................. JP2017-214586

(51) Int. Cl.
*G01L 19/06* (2006.01)
*G01L 9/00* (2006.01)

(52) U.S. Cl.
CPC .......... *G01L 19/069* (2013.01); *G01L 9/0042* (2013.01)

(58) Field of Classification Search
None
See application file for complete search history.

(56) References Cited

U.S. PATENT DOCUMENTS 6,474,170 B1 * 11/2002 Yamagishi ............ G01L 9/0051
73/723
8,314,485 B2 * 11/2012 Ono ...................... H01L 23/055
257/708

(Continued)

FOREIGN PATENT DOCUMENTS

JP          56-37531 A      4/1981
JP          10-185722 A     7/1998

(Continued)

OTHER PUBLICATIONS

International Search Report from corresponding International Application No. PCT/JP2018/040658, 10pgs, dated Dec. 4, 2018.

*Primary Examiner* — Peter J Macchiarolo
*Assistant Examiner* — Jermaine L Jenkins
(74) *Attorney, Agent, or Firm* — Crowell & Moring LLP (57) ABSTRACT

A pressure sensor includes a pressure detecting element; a base material on which the pressure detecting element is mounted; a pad electrode provided on the base material and electrically connected to the pressure detecting element; a ground electrode provided on the base material and spaced from the pad electrode; and a cap having a tubular shape, the cap surrounding a periphery of the pressure detecting element on the base material and being attached to the ground electrode with a conductive adhesive. An inner receiving section is provided between an inner peripheral surface of the cap and a ground-electrode-side end surface of the cap, the inner receiving section thereby preventing excessive spreading of the conductive adhesive. The cap can be attached to the base material with the conductive adhesive without causing excessive spreading of the conductive adhesive.

7 Claims, 9 Drawing Sheets (56) References Cited

U.S. PATENT DOCUMENTS

2004/0046245 A1    3/2004  Minervini
2016/0023893 A1*  1/2016  Besling ............... B81C 1/00246
                                                                   438/51
2018/0172531 A1*  6/2018  Nishiyama .......... G01L 19/0084

FOREIGN PATENT DOCUMENTS

| JP | 10-300605 A | 11/1998 |
|----|----|----|
| JP | 2000-206137 | 7/2000 |
| JP | 2013-167468 | 8/2013 |
| JP | 2014-106151 A | 6/2014 |
| JP | 2015-090318 | 5/2015 |

* cited by examiner

PRESSURE SENSOR WITH A CAP STRUCTURED WITH AN INNER RECEIVING SECTION THAT PREVENTS EXCESSIVE SPREADING OF A CONDUCTIVE ADHESIVE

CLAIM OF PRIORITY

This application is a Continuation of International Application No. PCT/JP2018/040658 filed on Nov. 1, 2018, which claims benefit of priority to Japanese Patent Application No. 2017-214586 filed on Nov. 7, 2017. The entire contents of each application noted above are hereby incorporated by reference.

BACKGROUND

1. Field of the Disclosure

The present disclosure relates to pressure sensors, and more particularly to a pressure sensor including a tubular cap that covers the periphery of a pressure detecting element.

2. Description of the Related Art

In recent years, with an increase in demand for high-accuracy pressure sensors, it has become important to protect a sensor element or a control IC from electromagnetic noise by covering the periphery of the functional element with a cap and setting the cap to a ground potential. Although the cap needs to be attached with a conductive adhesive, there is a risk that excessive spreading of the conductive adhesive will occur when the cap is pressed to attach the cap. To prevent the conductive adhesive from spreading excessively and coming into contact with a pad electrode provided on a base material, the pad electrode and the cap need to be spaced from each other by a relatively large distance. This makes it difficult to reduce the overall size of the sensor.

Japanese Unexamined Patent Application Publication No. 2000-206137 discloses a structure including a cap that is tapered such that the thickness thereof decreases toward an end to prevent entrance of an adhesive when the cap is joined to a casing.

Japanese Unexamined Patent Application Publication No. 2013-167468 discloses a structure including an attachment portion having a tapered side surface to prevent an adhesive from blocking a pressure introduction hole.

Japanese Unexamined Patent Application Publication No. 2015-090318 discloses a structure including a sleeve (frame component) having a tapered inner wall surface to prevent an adhesive from coming into contact with a sensor by causing the adhesive to flow upward along the inner wall surface when the sleeve is attached to a circuit board.

In the case where the cap is attached to the base material with the conductive adhesive, when the conductive adhesive is applied to the base material by an ejection method using, for example, a dispenser, it is difficult to control the amount of conductive adhesive that is applied. Application of an excessive amount of conductive adhesive causes an increase in the amount of conductive adhesive that spreads when the cap is attached, and increases the possibility that the conductive adhesive will spread excessively and come into contact with the electrode pad. On the other hand, when the amount of conductive adhesive applied is insufficient; there is a risk that the cap cannot be reliably attached.

Accordingly, the conductive adhesive may instead be applied to an end surface of the cap in advance, and the cap having the conductive adhesive applied thereto may be attached to the base material (transfer method). According to the transfer method, the conductive adhesive may be uniformly applied to the end surface of the cap. However, since the conductive adhesive is applied to the end surface of the cap over the entire area thereof, it is important to prevent excessive spreading of the conductive adhesive when the cap is attached to the base material.

SUMMARY

A pressure sensor includes a pressure detecting element; a base material on which the pressure detecting element is mounted; a pad electrode provided on the base material and electrically connected to the pressure detecting element; a ground electrode provided on the base material and spaced from the pad electrode; and a cap having a tubular shape, the cap surrounding a periphery of the pressure detecting element on the base material and being attached to the ground electrode with a conductive adhesive. An inner receiving section is provided between an inner peripheral surface of the cap and a ground-electrode-side end surface of the cap, the inner receiving section preventing excessive spreading of the conductive adhesive.

According to the above-described structure, the inner receiving section that prevents excessive spreading of the conductive adhesive is provided between the inner peripheral surface of the cap and the ground-electrode-side end surface of the cap. Therefore, even if the conductive adhesive is spread due to a pressing force applied to the cap when the cap having the conductive adhesive applied to the ground-electrode-side end surface thereof is attached to the base material, the conductive adhesive that is spread is received by the inner receiving section and does not reach the pad electrode disposed inside the cap.

According to the present invention, a pressure sensor in which a cap can be attached to a base material with a conductive adhesive without causing excessive spreading of the conductive adhesive can be provided.

DESCRIPTION OF THE EXEMPLARY EMBODIMENTS

Embodiments of the present invention will now be described with reference to the drawings. In the following description, the same components are denoted by the same reference signs, and description of components that are previously described will be omitted as appropriate.

Figure 1A:
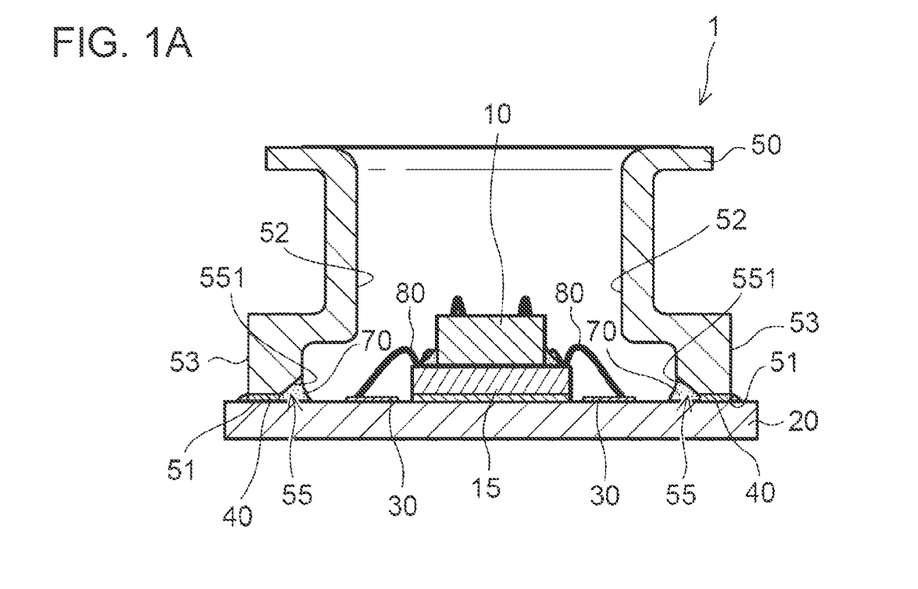
FIGS. 1A and 1B illustrate a pressure sensor according to a first embodiment.
Figure 1B:
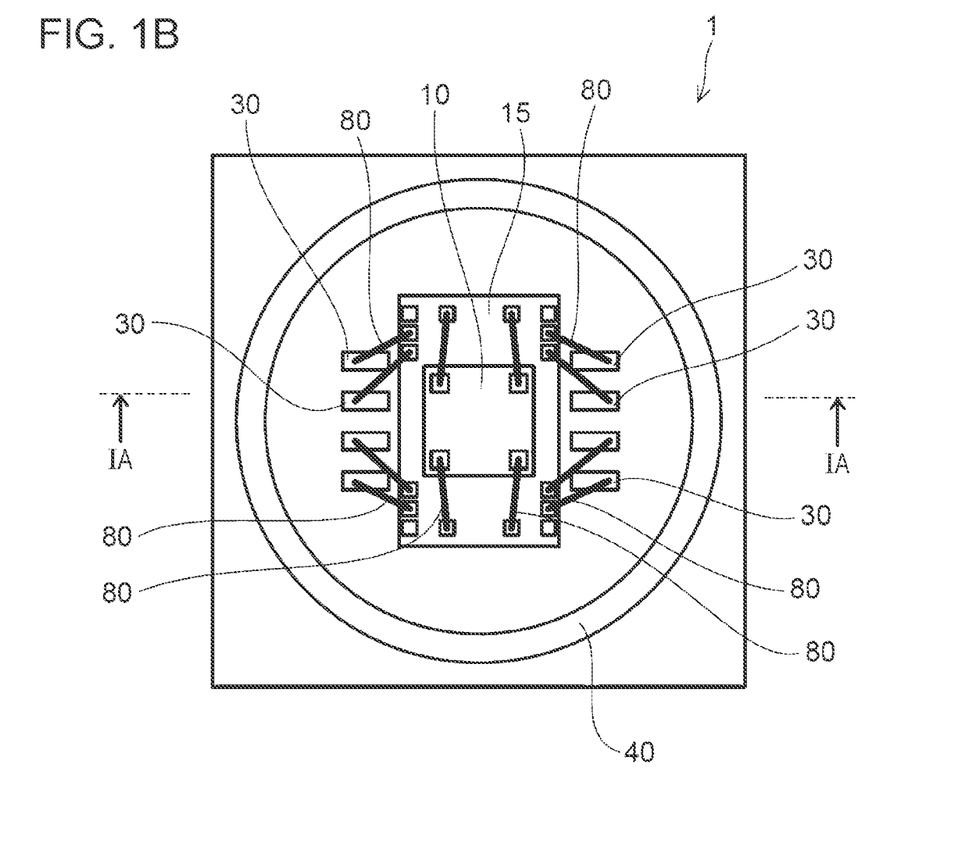

FIGS. 1A and 1B illustrate a pressure sensor 1 according to a first embodiment.

FIG. 1A is a sectional view of the pressure sensor 1, and FIG. 1B is a plan view of the pressure sensor 1. The sectional view shown in FIG. 1A is taken along line IA-IA in FIG. 1B. FIG. 1B does not illustrate a cap 50 for convenience of description.

Referring to FIG. 1, the pressure sensor 1 is a sensor that detects a pressure applied thereto with a pressure detecting element 10. The pressure sensor 1 includes a pressure detecting element 10; a base material 20 on which the pressure detecting element 10 is mounted; pad electrodes 30 provided on the base material 20 and electrically connected to the pressure detecting element 10; a ground electrode 40 provided around the pressure detecting element 10 on the base material 20; and a tubular cap 50 that is connected to the ground electrode 40 with a conductive adhesive 70.

The pressure detecting element 10 is, for example, a chip component including a diaphragm formed on a silicon semiconductor by, for example, etching. The base material 20 is made of, for example, a ceramic such as alumina. In addition to the pressure detecting element 10, a circuit element 15 is also mounted on the base material 20. According to the present embodiment, the pressure detecting element 10 and the circuit element 15 are stacked together to reduce the overall size. The pressure detecting element 10 and the circuit element 15 may instead be arranged next to each other on the base material 20.

The pad electrodes 30 and the ground electrode 40, which are composed of, for example, metallized patterns, are formed on the base material 20. The pressure detecting element 10 and the circuit element 15 are connected to each other by bonding wires 80. The pressure detecting element 10 is also connected to the pad electrodes 30 through the circuit element 15 by the bonding wires 80.

The ground electrode 40 is provided on the base material 20 to surround the peripheries of the pressure detecting element 10 and the circuit element 15. The ground electrode 40 is set to a ground potential, and is spaced from the pad electrodes 30.

The cap 50 is made of a conductive material, such as a metal. The cap 50 has a tubular shape and includes an inner peripheral surface 52, an outer peripheral surface 53, and a ground-electrode-side end surface 51. The cap 50 is attached to surround the peripheries of the pressure detecting element 10 and the circuit element 15 on the base material 20. The ground-electrode-side end surface 51 of the cap 50 is electrically connected to the ground electrode 40 by the conductive adhesive 70. Accordingly, the cap 50 is set to the ground potential and serves as an electromagnetic shield for the pressure detecting element 10 and the circuit element 15 surrounded by the cap 50.

The inside of the cap 50 (inside of the tube) may be filled with gel. In such a case, the pressure sensor 1 is waterproofed.

The pressure sensor 1 according to the present embodiment is structured such that an inner receiving section 55 that prevents excessive spreading of the conductive adhesive 70 is provided between the inner peripheral surface 52 of the cap 50 and the ground-electrode-side end surface 51 of the cap 50. The inner receiving section 55 is preferably provided to extend over the entire circumference of the cap 50.

Figure 2:
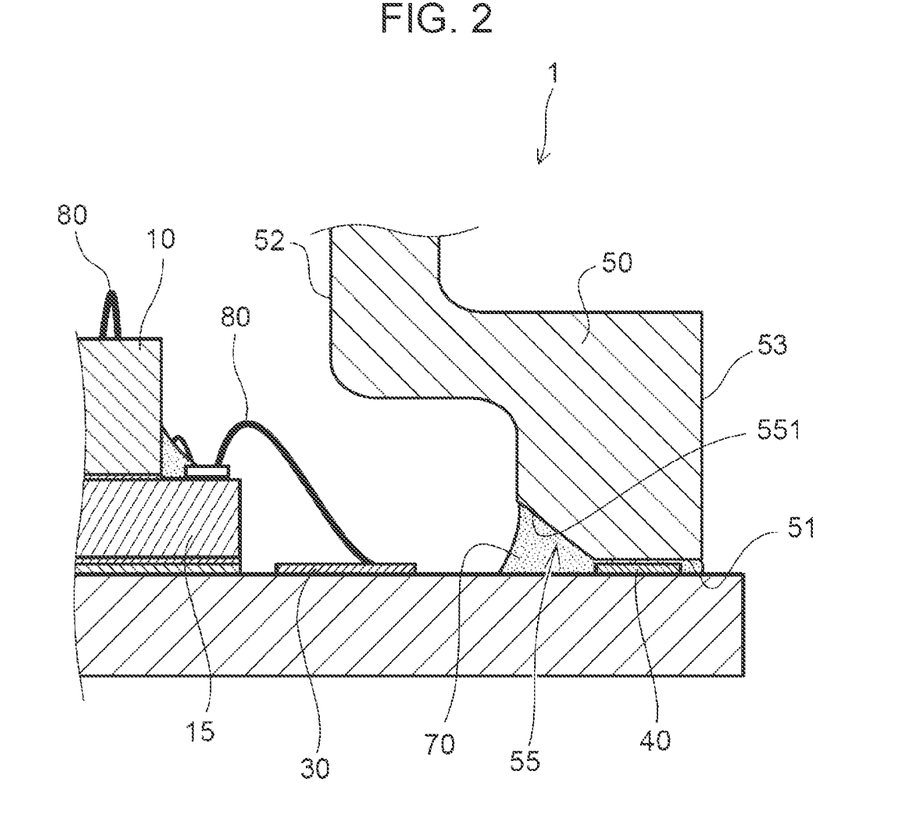
FIG. 2 is an enlarged partial sectional view of an inner receiving section.

FIG. 2 is an enlarged partial sectional view of the inner receiving section 55.

The inner receiving section 55 is provided to receive the conductive adhesive 70 interposed between the ground-electrode-side end surface 51 and the ground electrode 40 when the conductive adhesive 70 is spread due to a pressing force applied by the cap 50 in the process of attaching the cap 50.

The inner receiving section 55 illustrated in FIG. 2 may have an inclined surface 551 provided between the ground-electrode-side end surface 51 and the inner peripheral surface 52. The inclined surface 551 defines a reservoir region for the conductive adhesive 70 so that the conductive adhesive 70 that spreads toward the inside of the cap 50 (inside of the tube) can be received. Thus, spreading of the conductive adhesive 70 toward the inside can be reduced to prevent the conductive adhesive 70 from coming into contact with the pad electrodes 30.

In the example illustrated in FIG. 2, the inner receiving section 55 may have the inclined surface 551 that is tapered between the ground-electrode-side end surface 51 and the inner peripheral surface 52 of the cap 50. The inclined surface 551 may be tapered such that the diameter thereof decreases from the ground-electrode-side end surface 51 to the inner peripheral surface 52. Thus, when the cap 50 is attached to the base material 20, the conductive adhesive 70 that is spread due to the pressing force applied to the cap 50 and that reaches the inner receiving section 55 is introduced into the inner receiving section 55 along the inclined surface 551.

The angle of the inclined surface 551, which is a tapered surface, with respect to a surface of the base material 20 is an acute angle (for example, about 30 to 60 degrees). The width of the region in which the inclined surface 551 is provided (width in a direction perpendicular to the surface of the base material 20) is greater than or equal to about 150 μm and less than or equal to about 200 μm. The inner receiving section 55 having such a structure facilitates control of a transfer area when the conductive adhesive 70 is transferred to the ground-electrode-side end surface 51 of the cap 50.

FIGS. 3A to 4B are sectional views illustrating a procedure from application of the conductive adhesive 70 to attachment of the cap 50.

Figure 3A:
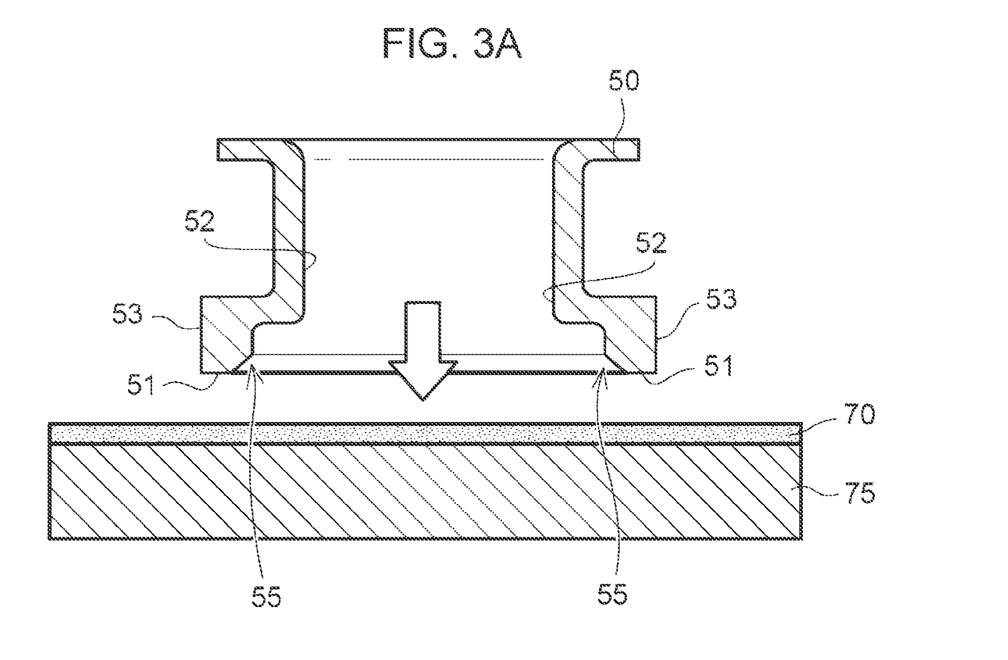
FIGS. 3A and 3B are sectional views illustrating a procedure from application of a conductive adhesive to attachment of a cap.
Figure 3B:
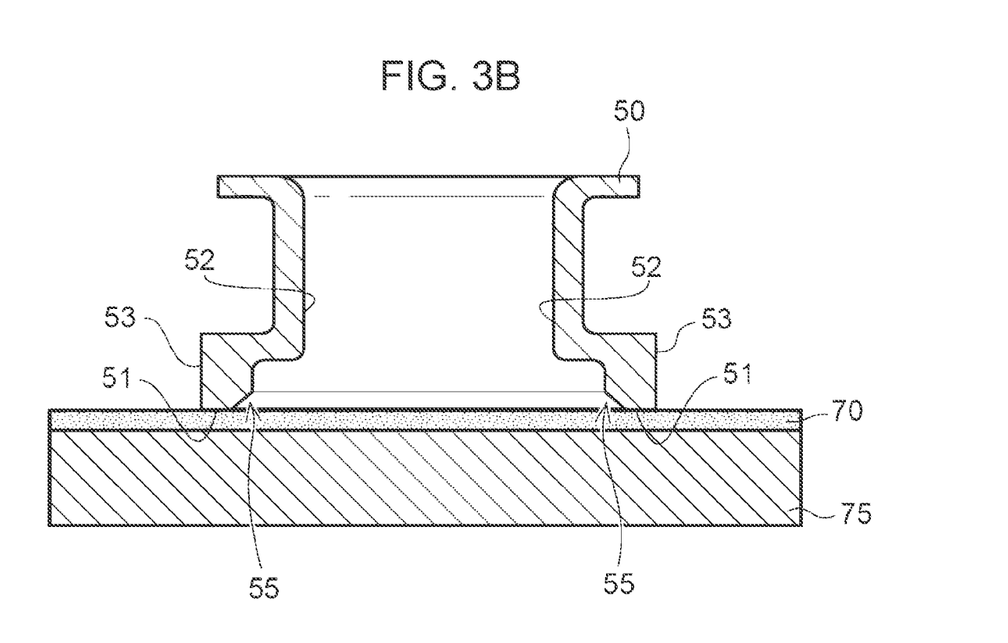

As illustrated in FIG. 3A, the conductive adhesive 70 is uniformly applied to a base 75. To transfer the conductive adhesive 70 to the ground-electrode-side end surface 51 of the cap 50, the ground-electrode-side end surface 51 of the cap 50 is brought into contact with the conductive adhesive 70 on the base 75 (see FIGS. 3A and 3B).

Figure 4A:
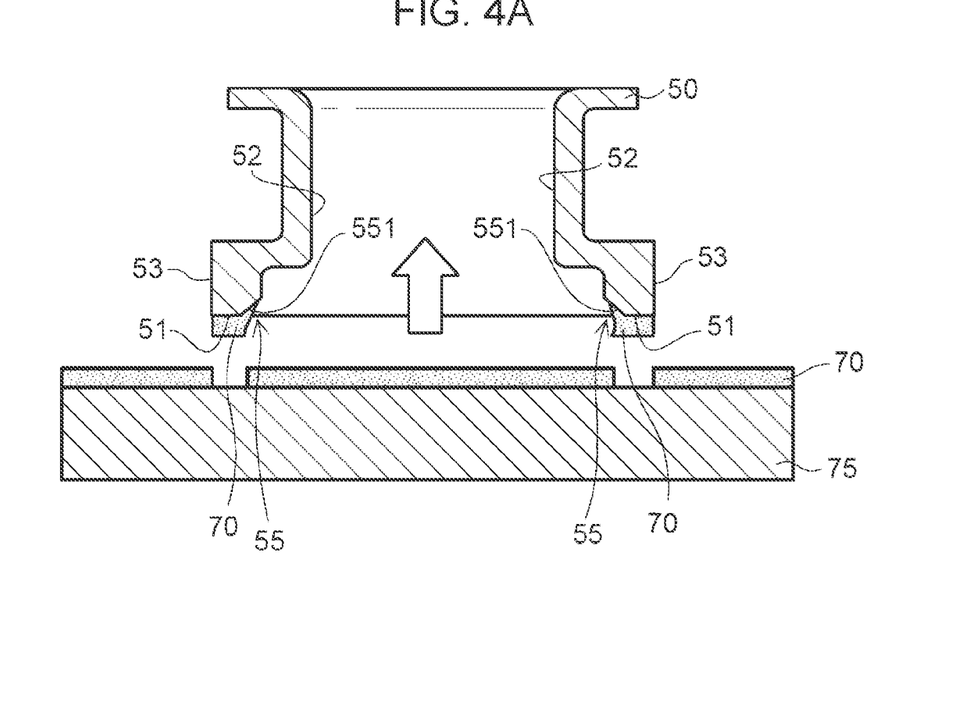
FIGS. 4A and 4B are sectional views illustrating the procedure from the application of the conductive adhesive to the attachment of the cap.

Next, as illustrated in FIG. 4A, the cap 50 is moved away from the base 75 so that the conductive adhesive 70 that has been in contact with the ground-electrode-side end surface 51 is transferred from the base 75 to the ground-electrode-side end surface 51. When the inclined surface 551 of the inner receiving section 55 is provided as in the present embodiment, the conductive adhesive 70 that has been transferred does not reach the inner peripheral surface 52 of the cap 50.

Figure 4B:
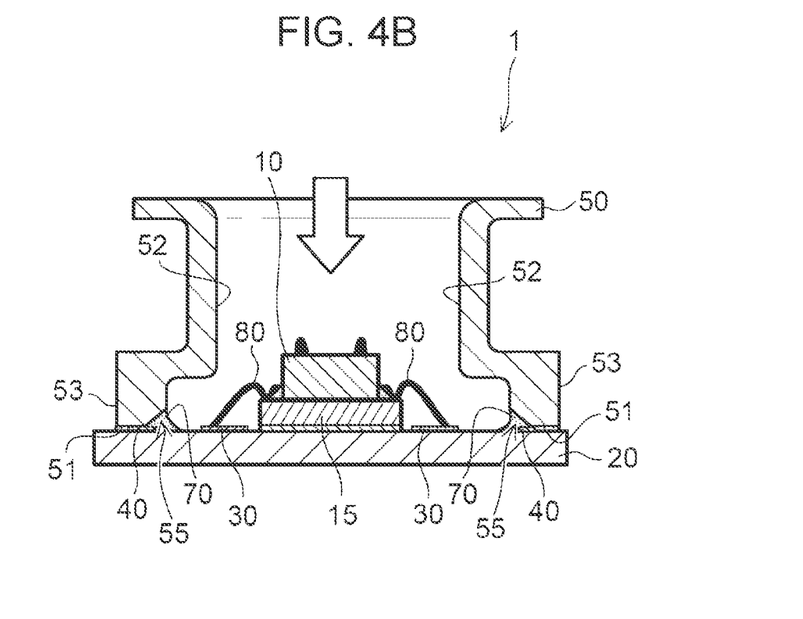

After that, as illustrated in FIG. 4B, the cap 50 to which the conductive adhesive 70 has been transferred is attached to the base material 20. Although the conductive adhesive 70 is spread due to the pressing force applied to attach the cap 50, the conductive adhesive 70 that spreads toward the inside of the cap 50 (inside of the tube) is received by the inner receiving section 55, and excessive spreading thereof toward the inside of the cap 50 is prevented.

A method for transferring the conductive adhesive 70 to the cap 50 will now be described.

Figure 5A:
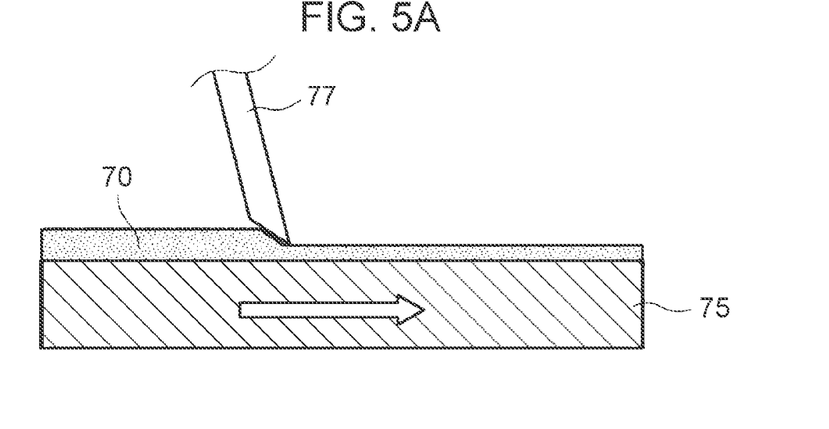
FIGS. 5A to 5C are schematic diagrams illustrating a method for transferring the conductive adhesive to the cap.
Figure 5B:
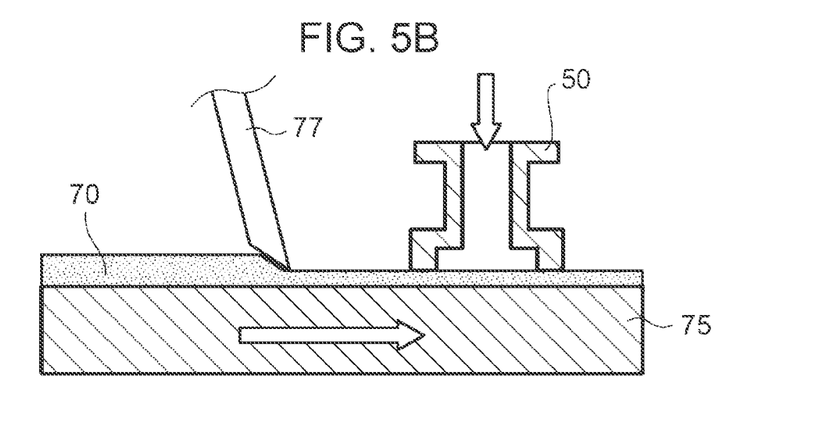
Figure 5C:
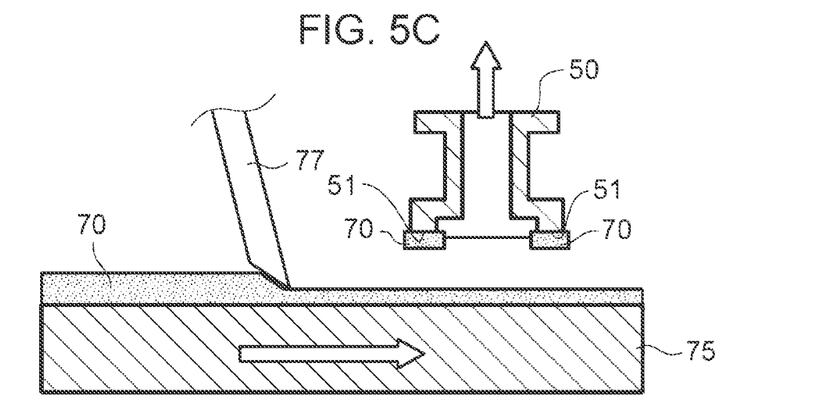

FIGS. 5A to 5C are schematic diagrams illustrating the method for transferring the conductive adhesive 70 to the cap 50.

Figure 6A:
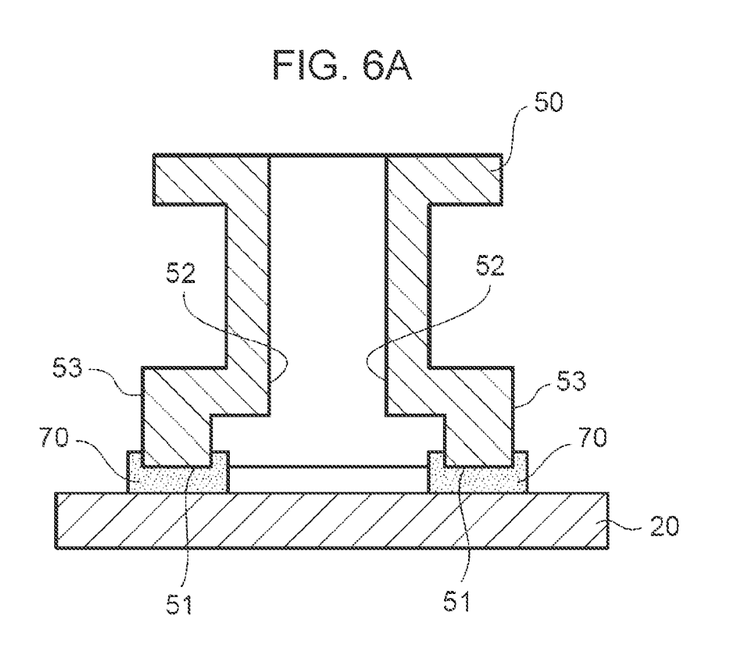
FIGS. 6A and 6B are schematic diagrams illustrating the manners in which the cap is attached.
Figure 6B:
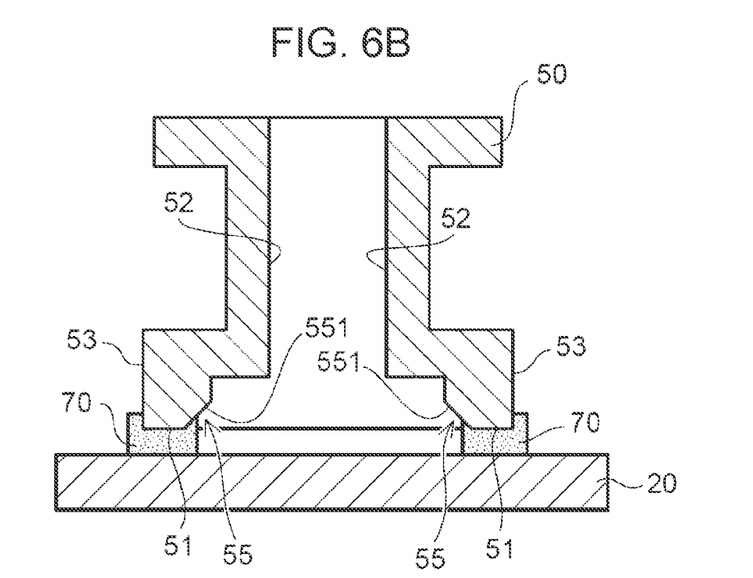

FIGS. 6A and 6B are schematic diagrams illustrating the manners in which the cap 50 is attached.

First, as illustrated in FIG. 5A, the conductive adhesive 70 is applied to a surface of the base 75, and is leveled so that the conductive adhesive 70 has a uniform thickness by using, for example, a squeegee 77 while rotating the base 75. The thickness of the conductive adhesive 70 is set to, for example, greater than or equal to about 20 μm and less than or equal to about 30 μm.

Next, as illustrated in FIG. 5B, the cap 50 is brought into contact with the conductive adhesive 70 having a uniform thickness. After that, as illustrated in FIG. 5C, the cap 50 is moved upward. As a result, the conductive adhesive 70 is transferred to an end surface (ground-electrode-side end surface 51) of the cap 50.

Next, as illustrated in FIG. 6A, the cap 50 to which the conductive adhesive 70 has been transferred is attached to the base material 20. In the example illustrated in FIG. 6A, the conductive adhesive 70 is spread from the ground-electrode-side end surface 51 to a portion of the inner peripheral surface 52 and a portion of the outer peripheral surface 53 of the cap 50. More specifically, the conductive adhesive 70 is transferred to the ground-electrode-side end surface 51 over the entire area thereof. In addition, since the ground-electrode-side end surface 51 adjoins the inner peripheral surface 52 and the outer peripheral surface 53, the conductive adhesive 70 is spread to the inner peripheral surface 52 and the outer peripheral surface 53 when the cap 50 is pressed.

In contrast, in FIG. 6B, the inner receiving section 55 having the inclined surface 551 is provided. Accordingly, even if the conductive adhesive 70 is transferred to the ground-electrode-side end surface 51 over the entire area thereof, the conductive adhesive 70 that is spread when the cap 50 is pressed is received by the inner receiving section 55 and does not reach the inner peripheral surface 52. Thus, excessive spreading of the conductive adhesive 70 is prevented.

In addition, the inner receiving section 55 facilitates control of the transfer area when the conductive adhesive 70 is transferred to the cap 50 as illustrated in FIGS. 5B and 5C. For example, when the conductive adhesive 70 is transferred, the cap 50 is slightly pushed into the conductive adhesive 70 from the position at which the ground-electrode-side end surface 51 of the cap 50 has come into contact with the conductive adhesive 70. Since the cap 50 is pushed into the conductive adhesive 70 in this manner, the conductive adhesive 70 not only adheres to the ground-electrode-side end surface 51 over the entire area thereof, but also adheres to a small portion of the inclined surface 551. Here, the amount by which the cap 50 is pushed into the conductive adhesive 70 from the position at which the ground-electrode-side end surface 51 has come into contact with the conductive adhesive 70 is referred to as a "transfer pressing amount".

To reliably attach the cap 50 with the conductive adhesive 70 and prevent excessive spreading of the conductive adhesive 70 at the same time, the transfer area of the conductive adhesive 70 needs to be in a range (range for appropriate transfer) such that the conductive adhesive 70 that spreads from the ground-electrode-side end surface 51 can be received by the inner receiving section 55. When the inner receiving section 55 having the inclined surface 551 is provided as in the present embodiment, the allowance for the transfer pressing amount with which the transfer area falls within the range for appropriate transfer can be increased.

In the case where the cap 50 does not include the inclined surface 551 (see FIG. 6A), the amount of conductive adhesive 70 that spreads from the ground-electrode-side end surface 51 to the inner peripheral surface 52 and the outer peripheral surface 53 increases in proportion to the transfer pressing amount. In contrast, in the case where the cap 50 includes the inclined surface 551 (see FIG. 6B), the conductive adhesive 70 does not reach the inner peripheral surface 52 even when the transfer pressing amount varies by an amount corresponding to the height of the inclined surface 551. Accordingly, the allowance for the transfer pressing amount of the cap 50 is increased, and control of the transfer area is facilitated.

The pressure sensor 1 according to the present embodiment includes the cap 50 provided with the inner receiving section 55 having the inclined surface 551. Accordingly, when the cap 50 is attached to the base material 20 with the conductive adhesive 70, the conductive adhesive 70 that is spread due to the pressing force applied to the cap 50 can be received by the inner receiving section 55, so that the conductive adhesive 70 can be prevented from reaching the pad electrodes 30 disposed inside the cap 50. In addition, the transfer area of the conductive adhesive 70 can be easily controlled, so that excessive or insufficient transferring of the conductive adhesive 70 does not occur. Thus, the cap 50 can be reliably attached without causing unnecessary spreading of the conductive adhesive 70.

The present embodiment is particularly effective when the pressure sensor 1 is small and when the diameter of the cap 50 is greater than or equal to about 1 mm and less than or equal to about 10 mm. As the diameter of the cap 50 decreases, the distance between the cap 50 and each pad electrode 30 inside the cap 50 (inside the tube) decreases. Therefore, when the cap 50 is attached to the base material 20, only a very small amount of spreading of the conductive adhesive 70 is acceptable. In the case where the inner receiving section 55 for preventing excessive spreading of the conductive adhesive 70 is provided as in the present embodiment, even when the pressure sensor 1 is small, short-circuiting between the cap 50 and the pad electrodes 30 due to excessive spreading of the conductive adhesive 70 can be reliably prevented.

Although the inclined surface 551 of the inner receiving section 55 is tapered in the above-described example, the inclined surface 551 may instead be a curved surface (for example, a rounded surface). In the case where the inclined surface 551 includes a curved surface, when the cap 50 is attached to the base material 20, the angle of the inclined surface 551 is small in an early stage of introduction of the conductive adhesive 70 into the inner receiving section 55. Therefore, the conductive adhesive 70 can be easily introduced into the inner receiving section 55 due to the capillary action.

Figure 7A:
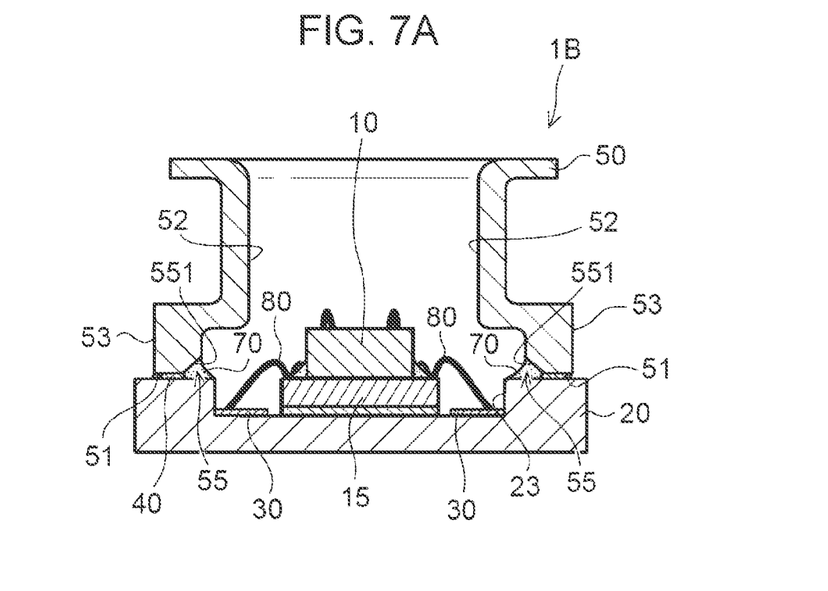
FIGS. 7A and 7B illustrate a pressure sensor according to a second embodiment.
Figure 7B:
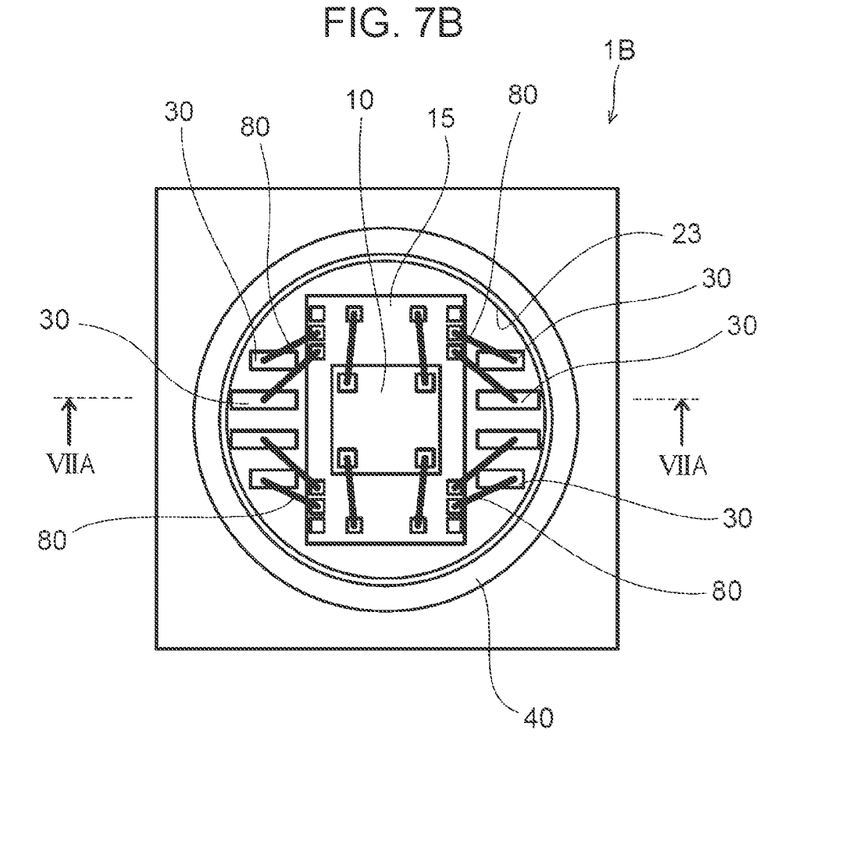

FIGS. 7A and 7B illustrate a pressure sensor 1B according to a second embodiment.

FIG. 7A is a sectional view of the pressure sensor 1B, and FIG. 7B is a plan view of the pressure sensor 1B. The sectional view shown in FIG. 7A is taken along line VIIA-VIIA in FIG. 7B. FIG. 7B does not illustrate the cap 50 for convenience of description.

The pressure sensor 1B may be structured such that the base material 20 includes a recessed portion 23 provided between the inner receiving section 55 and the pad electrodes 30. The recessed portion 23 defines a step between a surface of the base material 20 on which the pad electrodes 30 are provided and a surface of the base material 20 on which the ground electrode 40 is provided. When the recessed portion 23 is provided, the creepage distance between the ground-electrode-side end surface 51 of the cap 50 and each pad electrode 30 is greater than when the base material 20 is flat. Accordingly, even if the conductive adhesive 70 is spread when the cap 50 is attached to the base material 20, the conductive adhesive 70 does not easily reach the pad electrodes 30.

In addition, the height of the pressure sensor 1B can be reduced by mounting the pressure detecting element 10 and the circuit element 15 in the recessed portion 23. Furthermore, since the creepage distance between the ground-electrode-side end surface 51 and each pad electrode 30 extends in the height direction, the outer diameter of the pressure sensor 1B is less than when the creepage distance extends in a planar direction.

Figure 8:
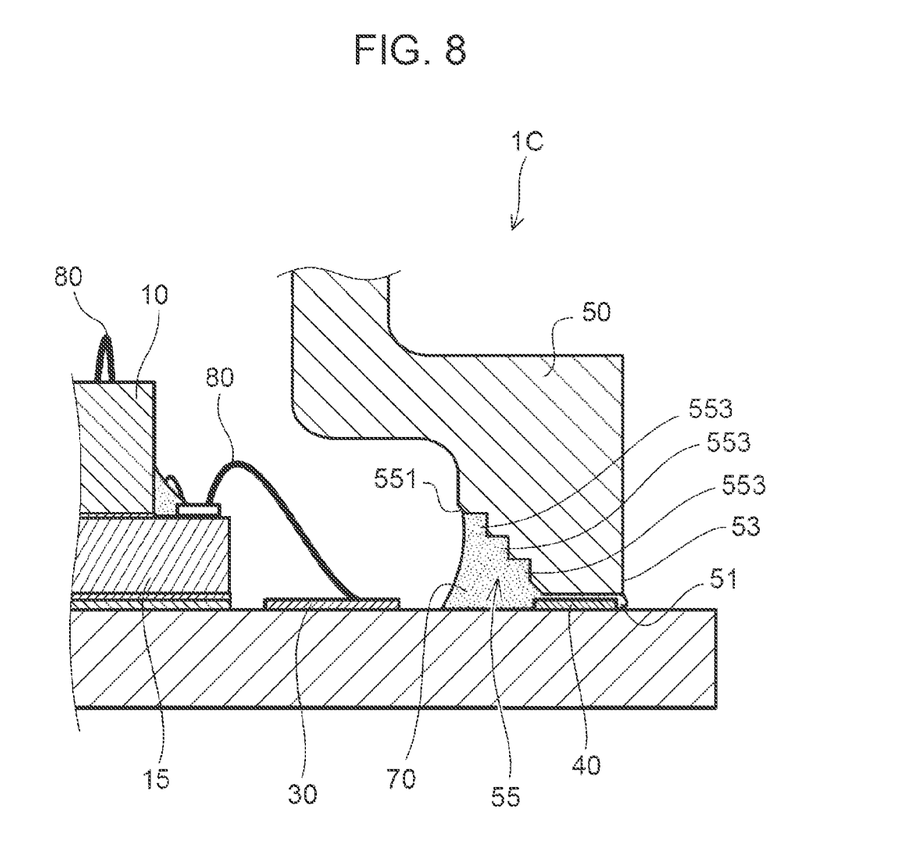
FIG. 8 is an enlarged partial sectional view of a pressure sensor according to a third embodiment.

FIG. 8 is an enlarged partial sectional view of a pressure sensor 1C according to a third embodiment.

As illustrated in FIG. 8, the pressure sensor 1C according to the third embodiment may be structured such that the inclined surface 551 of the inner receiving section 55 has one or more grooves 553 that extend in the circumferential direction of the cap 50. The grooves 553 are preferably formed in the inclined surface 551 over the entire circumference thereof in the circumferential direction of the cap 50. However, the grooves 553 may instead be formed discontinuously in the circumference direction.

When the above-described grooves 553 are formed in the inclined surface 551, the conductive adhesive 70 received by the inner receiving section 55 enters the grooves 553. Thus, as compared to when the grooves 553 are not provided, the amount of conductive adhesive 70 that can be received is greater by an amount corresponding to the capacity of the grooves 553. Accordingly, even when a large amount of conductive adhesive 70 is spread, the conductive adhesive 70 can be received by the grooves 553, so that excessive spreading thereof toward the inside of the cap 50 (inside of the tube) can be positively prevented.

Fourth Embodiment

Figure 9:
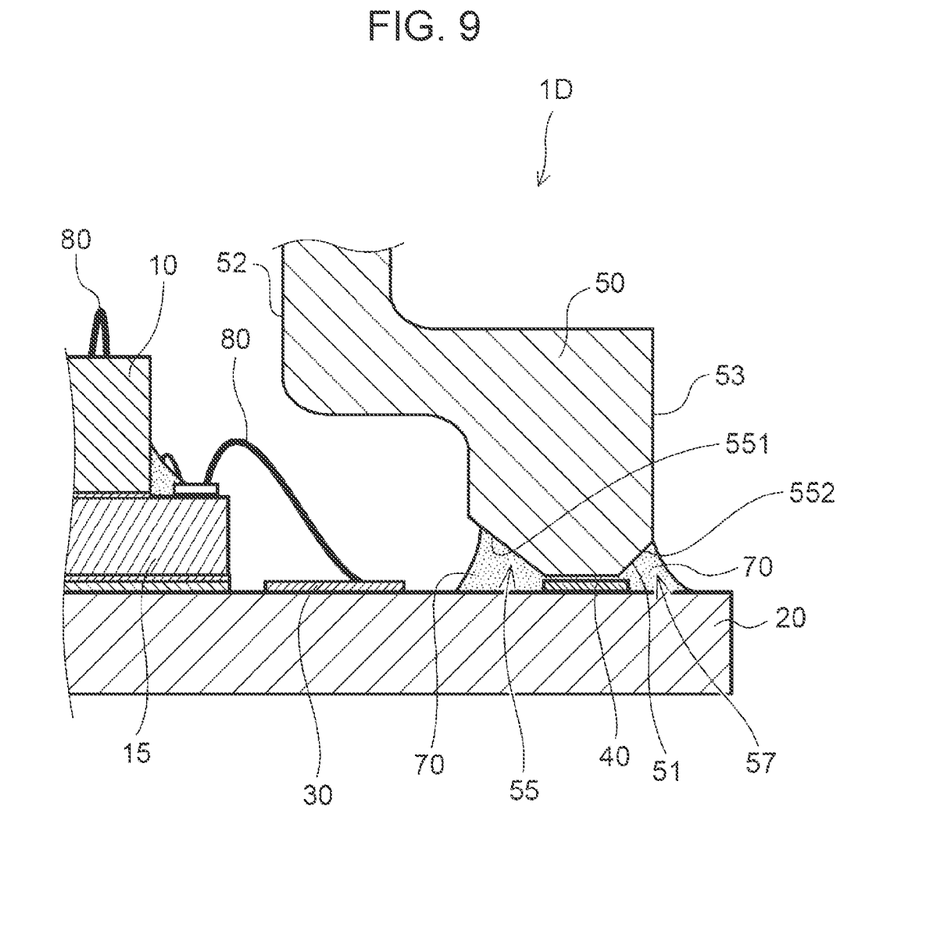
FIG. 9 is an enlarged partial sectional view of a pressure sensor according to a fourth embodiment.

FIG. 9 is an enlarged partial sectional view of a pressure sensor 1D according to a fourth embodiment.

As illustrated in FIG. 9, the pressure sensor 1D according to the fourth embodiment may be structured such that an outer receiving section 57 that prevents excessive spreading of the conductive adhesive 70 is provided between the outer peripheral surface 53 of the cap 50 and the ground-electrode-side end surface 51 of the cap 50.

The outer receiving section 57 has an inclined surface 552 that is similar to that of the inner receiving section 55. The inclined surface 552 may be a tapered surface or a curved surface. The inclined surface 552 may have the grooves 553 illustrated in FIG. 8.

In the case where the above-described outer receiving section 57 is provided, the conductive adhesive 70 that is spread toward the outside of the cap 50 when the cap 50 is attached to the base material 20 can be received by the outer receiving section 57. Since the conductive adhesive 70 that is spread toward the outside of the cap 50 can be received by the outer receiving section 57, excessive spreading of the conductive adhesive 70 toward the outside of the cap 50 can be prevented.

In addition, when the conductive adhesive 70 that is spread toward the outside is received by the outer receiving section 57, the manner in which the conductive adhesive 70 is spread can be easily determined based on the appearance observed from the outside of the cap 50. The conductive adhesive 70 that is spread toward the inside of the cap 50 is not visible from the outside of the cap 50. In contrast, the manner in which conductive adhesive 70 is spread toward the outside of the cap 50 can be determined by observation from the outside based on the manner in which the conductive adhesive 70 is received by the outer receiving section 57.

In addition, when the correlation between the manner in which the conductive adhesive 70 is received by the outer receiving section 57 and the manner in which the conductive adhesive 70 is received by the inner receiving section 55 is obtained in advance, the manner in which the conductive adhesive 70 is spread toward the inside can be determined based on the manner in which the conductive adhesive 70 is received by the outer receiving section 57.

As described above, the above-described embodiments provide the pressure sensors 1, 1B, 1C, and 1D in which the cap 50 can be attached to the base material 20 with the conductive adhesive 70 without causing excessive spreading of the conductive adhesive 70.

Although the embodiments have been described above, the present invention is not limited to the above-described examples. Structures obtained by a person skilled in the art by adding or omitting components to or from the above-described embodiments, performing a design change on the above-described embodiments, or combining the features of the structural examples of the above-described embodiments as appropriate are included in the scope of the present invention as long as the gist of the present invention is not impaired.

What is claimed is:

1. A pressure sensor comprising:
    a pressure detecting element;
    a base material on which the pressure detecting element is mounted;
    a pad electrode provided on the base material and electrically connected to the pressure detecting element;
    a ground electrode provided on the base material and spaced from the pad electrode; and
    a cap surrounding a periphery of the pressure detecting element on the base material and being attached to the ground electrode with a conductive adhesive,
    wherein an inner receiving section is provided between an inner peripheral surface of the cap and a ground-electrode-side end surface of the cap, wherein the inner receiving section has an inclined surface having a diameter that decreases from a ground-electrode-side end surface to the inner peripheral surface, whereby the inner receiving section prevents excessive spreading of the conductive adhesive.

2. The pressure sensor according to claim 1, wherein the cap has a tubular shape.

3. The pressure sensor according to claim 1, wherein the inclined surface includes a tapered surface.

4. The pressure sensor according to claim 3, wherein the inclined surface includes a curved surface.

5. The pressure sensor according to claim 1, wherein the inner receiving section has a groove that extends in a circumferential direction of the cap.

6. The pressure sensor according to claim 1, wherein the base material includes a recessed portion provided between the ground electrode and the pad electrode.

7. The pressure sensor according to claim 1, wherein an outer receiving section is provided between an outer peripheral surface of the cap and the ground-electrode-side end surface of the cap, the outer receiving section preventing excessive spreading of the conductive adhesive.

\* \* \* \* \*